(12) United States Patent
Ewen et al.

(10) Patent No.: US 7,877,381 B2
(45) Date of Patent: Jan. 25, 2011

(54) PROGRESSIVE REFINEMENT OF A FEDERATED QUERY PLAN DURING QUERY EXECUTION

(75) Inventors: Stephan Eberhard Ewen, Stuttgart (DE); Holger Kache, San Jose, CA (US); Volker Gerhard Markl, San Jose, CA (US); Vijayshankar Raman, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 205 days.

(21) Appl. No.: 11/389,596

(22) Filed: Mar. 24, 2006

(65) Prior Publication Data

US 2007/0226186 A1  Sep. 27, 2007

(51) Int. Cl.
*G06F 7/00* (2006.01)
*G06F 17/00* (2006.01)

(52) U.S. Cl. .................................................. 707/719
(58) Field of Classification Search ........................ None
See application file for complete search history.

(56) References Cited

U.S. PATENT DOCUMENTS

| | | | |
|---|---|---|---|
| 6,006,220 A | 12/1999 | Haderle et al. |
| 6,799,202 B1 | 9/2004 | Hankinson et al. |
| 6,807,546 B2 | 10/2004 | Young-Lai |
| 2002/0099689 A1 | 7/2002 | Bergman et al. |
| 2004/0225639 A1 | 11/2004 | Jakobsson et al. |
| 2005/0065921 A1 | 3/2005 | Hrle et al. |
| 2005/0097078 A1 | 5/2005 | Lohman et al. |
| 2005/0267877 A1 | 12/2005 | Chaudhuri et al. |
| 2005/0289098 A1 | 12/2005 | Barsness et al. |

OTHER PUBLICATIONS

Alur et al., "DB2 II: Performance Monitoring, Tuning and Capacity Planning Guide," Nov. 2004, pp. 41-114.*
Kabra et al., "Efficient Mid-Query Re-Optimization of Sub-Optimal Query Execution Plans", SIGMOD Conference 1998, ACM Digital Library, pp. 106-117.
Ng et al., "Dynamic Query Re-Optimization", Eleventh International Conference on Scientific and Statistical Database management, Aug. 1999, pp. 264-273.
Markl et al., "Robust Query Processing through Progressive Optimization", SIGMOD Conference 2004, ACM Digital Library, pp. 1-12.
Pedersen et al., "Query Optimization for OLAP-XML Federations", DOLAP'02, Nov. 2002, ACM Digital Library, pp. 57-64.
Yin et al., "Evaluation XML-Extended OLAP Queries Based on a Physical Algebra", DOLAP'04, Nov. 2004, ACM Digital Library, pp. 73-82.
Braumandl et al, "Quality of Service in an Information Economy", ACM Transactions on Internet Technology, vol. 3, No. 4, Nov. 2003, pp. 291-333.

* cited by examiner

*Primary Examiner*—Kavita Padmanabhan
(74) *Attorney, Agent, or Firm*—Yee & Associates, P.C.; Doug H. Lefeve

(57) ABSTRACT

A way for progressively refining a query execution plan during query execution in a federated data system is provided. Re-optimization constraints are placed in the query execution plan during query compilation. When a re-optimization constraint is violated during query execution, a model of the query execution plan is refined using a partially executed query to form a new query execution plan. The new query execution plan is compiled. The compiled new query execution plan is executed.

22 Claims, 6 Drawing Sheets

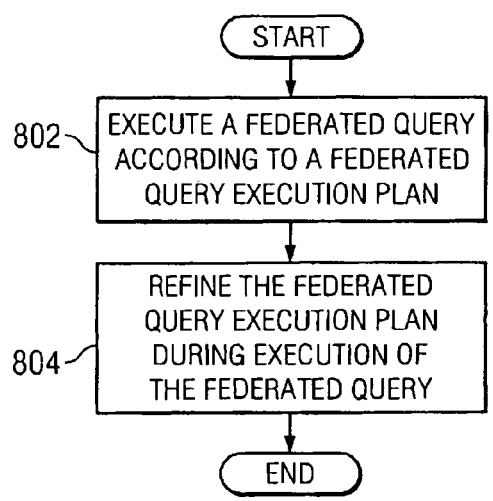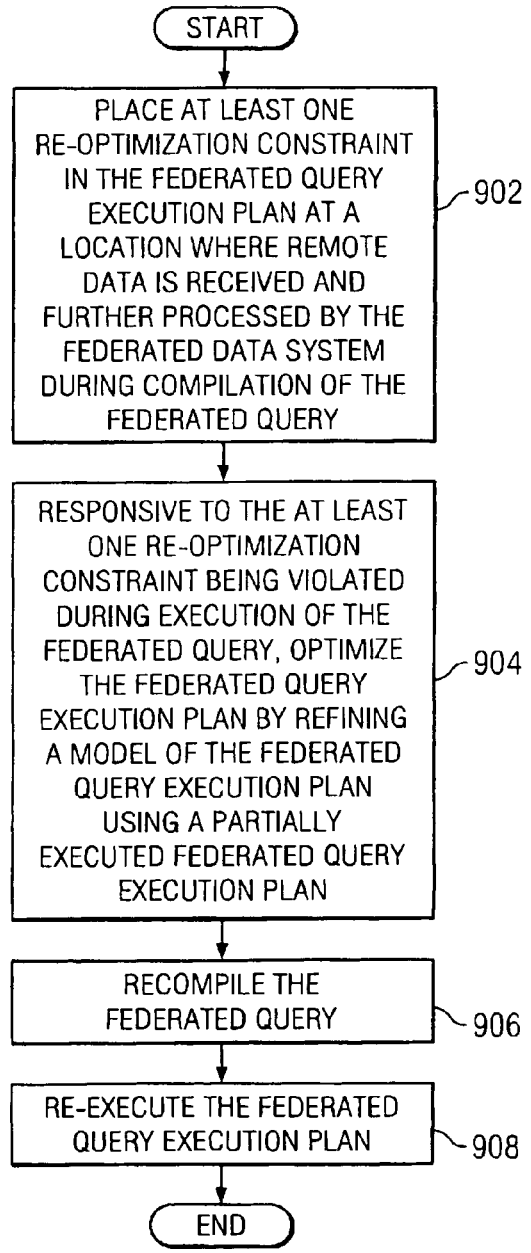

PROGRESSIVE REFINEMENT OF A FEDERATED QUERY PLAN DURING QUERY EXECUTION

BACKGROUND OF THE INVENTION

1. Field of the Invention

The present invention relates generally to a data processing system and in particular to query optimization in a database management system. More specifically, the invention relates to the progressive refinement of a federated query plan during query execution.

2. Description of the Related Art

Database Management Systems (DBMS) perform query plan selection by mathematically modeling the execution cost of candidate execution plans and choosing the cheapest query execution plan (QEP) according to that cost model. A cost model is a mathematical model that determines the execution cost of a query execution plan. Examples of execution costs of a query execution plan are commonly determined by I/O costs, CPU costs, and communication costs. A QEP is a functional program that is interpreted by the evaluation engine to produce the query result. A query execution plan outlines how the DBMS will run a specific query; that is, how the data will be found or written. For example, an important decision might be whether to use indexes and, if there are more indexes, which of these will be used. The cost model requires accurate estimates of the sizes of intermediate results of all steps in the QEP. Intermediate results are the results of a partial execution of a query execution plan. Intermediate results are communicated between the current query execution of the query execution plan and the next query re-optimization of the query execution plan. Furthermore, intermediate results also are communicated between any subsequent query execution of the query execution plan and another round of re-optimization of the query execution plan. A partially executed query execution plan is a query execution plan that is executed up to a checkpoint within the query execution plan that triggers re-optimization. A partially executed federated query execution plan is a federated query execution plan that is executed up to a checkpoint within the federated query execution plan that triggers re-optimization. Outdated or incomplete statistics, parameter markers, and complex skewed data frequently cause the selection of a sub-optimal query plan, which in turn results in bad query performance. Federated queries are regular relational queries accessing data on one or more remote relational or non-relational data sources, possibly combining them with tables stored in the federated DBMS server. A federated query execution plan is a query execution plan for a federated query. The execution of federated queries is typically divided between the federated server and the remote data sources. Outdated and incomplete statistics have a bigger impact on federated DBMS than on regular DBMS, as maintenance of federated statistics is unequally more complicated and expensive than the maintenance of the local statistics; consequently bad performance commonly occurs for federated queries due to the selection of a sub-optimal query plan.

Query refinement is the refining, or changing, of a query in order to improve upon the performance of the query. Current methods of query refinement are applied to the query compile phase and do not interfere with the query execution. All query compile time solutions are based on the idea of having perfect a-priori knowledge to compute a query plan. This knowledge may be obtained in several ways, such as, for example, statistics collection or sampling techniques. The solutions's goal is to improve query compilation through more accurate input parameters into the cost model. Current methods of query refinement are unable to overcome the problem of input data being incomplete or inaccurate. Current methods of query refinement are unable to recover from incorrect knowledge during query runtime.

SUMMARY OF THE INVENTION

The invention describes a computer implemented method, a computer program product, and a data processing system for progressively refining a query execution plan during query execution in a federated data system. During query compilation, at least one re-optimization constraint is placed in the query execution plan. In response to the at least one re-optimization constraint being violated during query execution, a model of the query execution plan is refined using a partially executed query to form a new query execution plan. The new query execution plan is compiled. The compiled new query execution plan is executed.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 8 is a flowchart illustrating the operation of progressively refining a query execution plan in a federated data system, in accordance with an exemplary embodiment of the present invention;

FIG. 9 is a flowchart illustrating the operation of refining the federated query execution plan during execution of the federated query, in accordance with an exemplary embodiment of the present invention.

DETAILED DESCRIPTION OF THE PREFERRED EMBODIMENT

Figure 1:
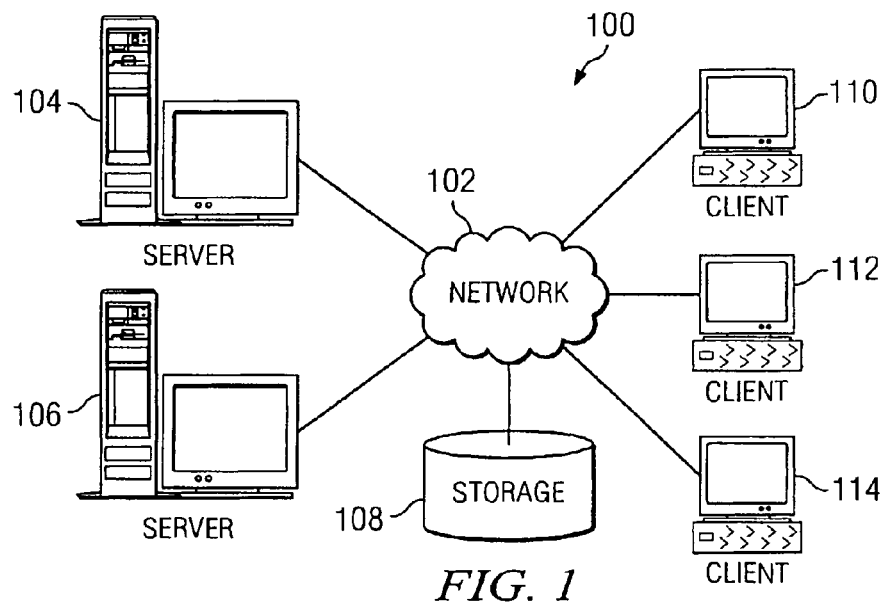
FIG. 1 is a pictorial representation of a network of data processing systems in which exemplary aspects of the present invention may be implemented.
Figure 2:
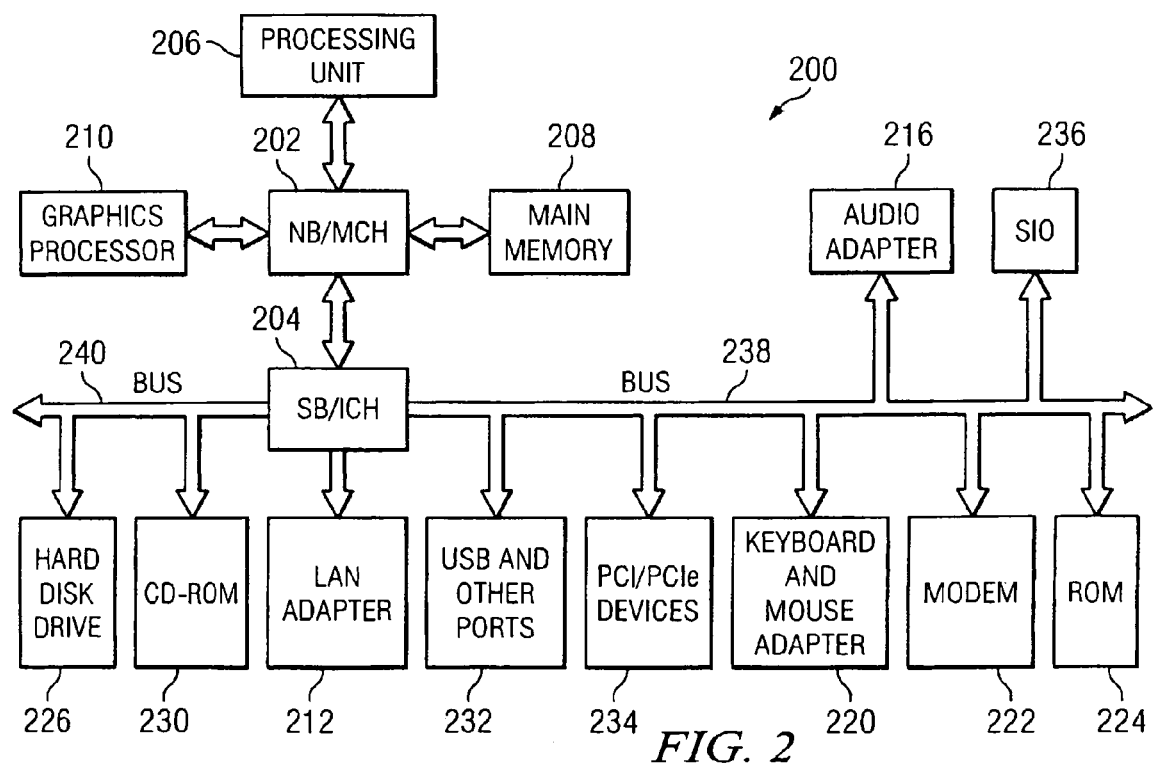
FIG. 2 is a block diagram of a data processing system in which exemplary aspects of the present invention may be implemented.

FIGS. 1-2 are provided as exemplary diagrams of data processing environments in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (NB/MCH) 202 and south bridge and input/output (I/O) controller hub (ICH) 204. Processing unit 206, main memory 208, and graphics processor 210 are connected to north bridge and memory controller hub 202. Graphics processor 210 may be connected to north bridge and memory controller hub 202 through an accelerated graphics port (AGP).

In the depicted example, local area network (LAN) adapter 212 connects to south bridge and I/O controller hub 204. Audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 204 through bus 238 and bus 240. PCI/PCIe devices may include, for example, Ethernet adapters, add-in cards and PC cards for notebook computers. PCI uses a card bus controller, while PCIe does not. ROM 224 may be, for example, a flash binary input/output system (BIOS).

Hard disk drive 226 and CD-ROM drive 230 connect to south bridge and I/O controller hub 204 through bus 240. Hard disk drive 226 and CD-ROM drive 230 may use, for example, an integrated drive electronics (IDE) or serial advanced technology attachment (SATA) interface. Super I/O (SIO) device 236 may be connected to south bridge and I/O controller hub 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java programs or applications executing on data processing system 200 (Java is a trademark of Sun Microsystems, Inc. in the United States, other countries, or both).

As a server, data processing system 200 may be, for example, an IBM eServer™ pSeries® computer system, running the Advanced Interactive Executive (AIX®) operating system or LINUX operating system (eServer, pSeries and AIX are trademarks of International Business Machines Corporation in the United States, other countries, or both while Linux is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as hard disk drive 226, and may be loaded into main memory 208 for execution by processing unit 206. The processes for embodiments of the present invention are performed by processing unit 206 using computer usable program code, which may be located in a memory such as, for example, main memory 208, read only memory 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course the bus system may be implemented using any type of communications fabric or architecture that provides for a transfer of data between different components or devices attached to the fabric or architecture. A communications unit may include one or more devices used to transmit and receive data, such as modem 222 or network adapter 212 of FIG. 2. A memory may be, for example, main memory 208, read only memory 224, or a cache such as found in north bridge and memory controller hub 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

Federated Data Systems

Figure 3:
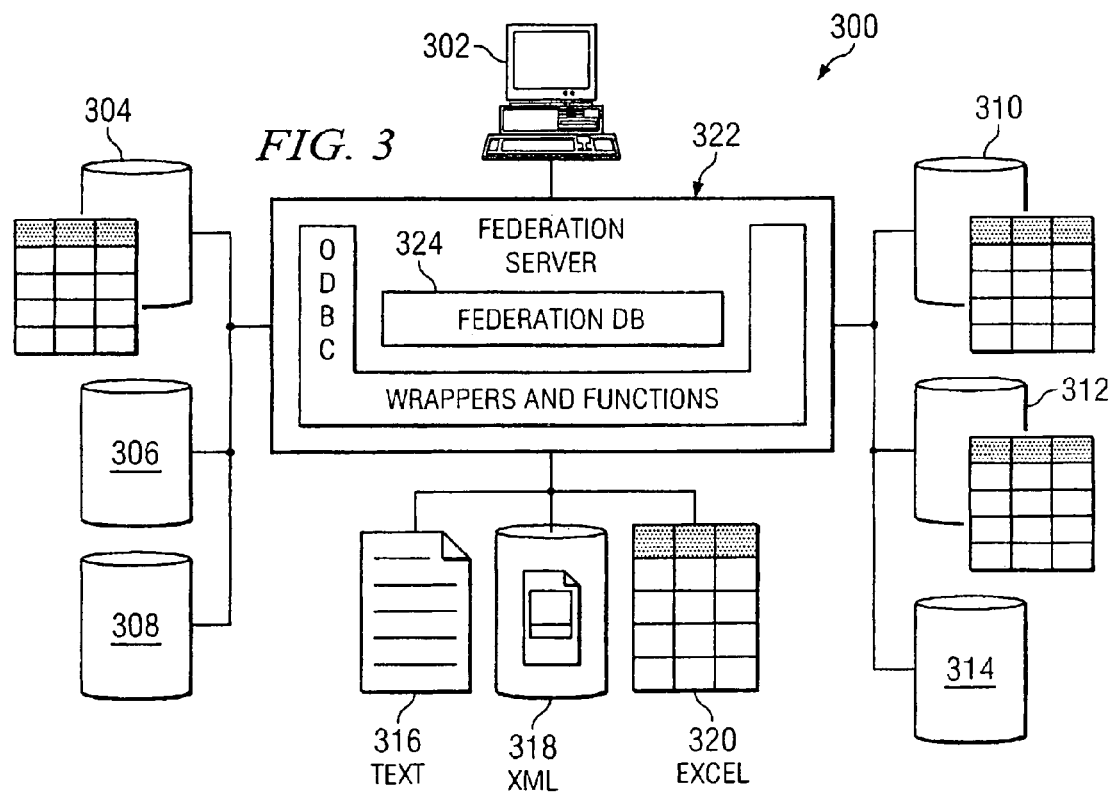
FIG. 3 is a block diagram of a federated data system in which exemplary aspects of the present invention may be implemented.

FIG. 3 is a block diagram of a federated data system in which exemplary aspects of the present invention may be implemented. A federated data system is a type of meta-database management system (DBMS) which transparently integrates multiple autonomous data sources into a single federated database. The constituent data sources are interconnected via a computer network, and may be geographically decentralized. Federated data system 300 includes federation server 322, which includes federation database (db) 324, data sources such as databases (dbs) 304, 306, 308, 310, 312, and 314, non-database sources such as XML tagged files such as XML 318, spreadsheets, such as Excel 320, text documents, such as text 316, and others. Client 302 accesses the federated database and the data sources. The data sources may be entirely relational or entirely non-relational or a combination of both relational and non-relational data sources. For example, databases 306, 308, and 314 might be relational data sources, while databases 304, 310, and 312 are non-relational data sources. Furthermore, the databases may be local, remote, or a combination of local and remote. Federation database 324 is a database that acts as a federated database, providing for the gathering of data from remote data sources.

A federated data system allows a user to join data from local and remote data sources, as if all the data is local. Furthermore, a federated data system allows a user to take advantage of the data source processing strengths, by sending distributed requests to the data sources for processing. A federated data system can compensate for the lack of data processing strength at the data source by processing parts of a distributed request at the federated server. With a federated data system, a user may send distributed requests to multiple data sources within a single structured query language (SQL) statement. For example, the user may join data that is located in a DB2 Universal Database™ table, an Oracle table, and a Sybase view in a single request.

Users and applications interface with the federated database managed by the federated server. The federated database contains catalog entries that identify data sources and their characteristics. The federated server consults the information stored in the federated database system catalog and the data source wrapper to determine the best plan for accessing remote data. In the present example, federation server 322 is depicted as including an Open DataBase Connectivity source wrapper.

Progressive Query Optimization

Robust Query Processing through Progressive Optimization (POP) is a known technique for use in traditional database management systems. POP is a mid query re-optimization technique that introduces special checkpoint operators that detect QEP sub-optimality during execution and triggers a repeated optimization to improve the QEP. A QEP is said to be sub-optimal if, based on new statistics, the plan violates any one of the re-optimization constraints. A re-optimization constraint is defined for every checkpoint in the query plan. The re-optimization constraint is a range of values defined in cardinality, or query execution cost, or CPU time, or IO time, or communication time, and determines whether to re-optimize the query at the given checkpoint. The re-optimization constraint is violated if the estimated cardinality, or query execution cost, or CPU time, or IO time, or communication time, as used during query compilation, is outside the range of acceptable values. In this case re-optimization is triggered at the given checkpoint. If the estimate is within the acceptable range of values, the query is not re-optimized at the given checkpoint. A checkpoint is a point during query execution at which the processed amount of data is compared to the estimates made for query compilation. POP ensures that when a plan is determined to be sub-optimal, it is not executed to the end. Instead, a different plan is developed and executed. The new plan is developed and recompiled starting from the very beginning of the query. Compiling means using a computer program to translate source code written in a particular programming language into computer-readable machine code that can be executed. A query execution plan is a form of computer readable code that can be compiled and executed. Recompiling means to compile the query execution plan again. Part of the compiling process is that the optimizer component of the compiler chooses the optimal plan. The optimizer may then decide whether to use the intermediate results obtained from the partially executed query execution plan. If the optimizer uses the intermediate results from the partially executed plan, then execution of the new plan will commence from the point at which the execution was previously aborted. As an example, assume there is a query to join three pieces of information, a customer's account, a customer's transactions, and a customer's address, together. A partial execution of the query execution plan results in only the customer's account and address being joined when execution is stopped. This result, the joined account and address information, is an intermediate result that is communicated to the query optimizer for use during re-optimization. However, if all or parts of the intermediate results from the partially executed plan are not used, execution of the new plan will commence from the point in the new plan at which the intermediate results are no longer used. That way, POP acts like an insurance against sub optimally performing queries.

Figure 4:
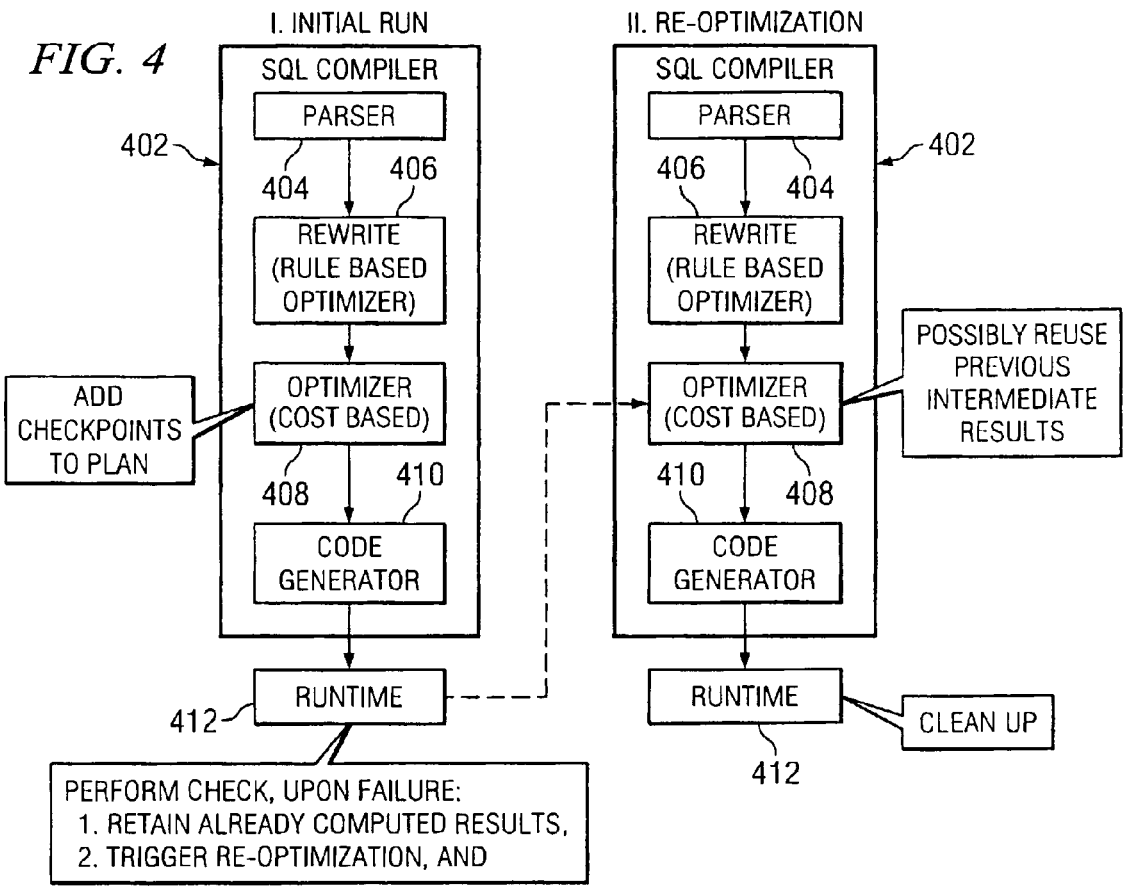
FIG. 4 is a block diagram depicting the initial run and the re-optimization run of a query, in accordance with an exemplary embodiment of the present invention.

FIG. 4 is a block diagram depicting the initial run and the re-optimization run of a query, in accordance with an exemplary embodiment of the present invention. SQL compiler 402 includes parser 404, rewrite unit 406, optimizer 408, and code generator 410. During the initial run, the query execution plan is partially executed by runtime 412 until the check condition triggers a re-optimization. During runtime 412, the checkpoints are checked for failure. Upon failure, the already computed results are retained and re-optimization is triggered. During the initial run, optimizer 408 adds checkpoints to the QEP. During the re-optimization run of the query, optimizer 408 may add checkpoints to the new QEP and may become the initial run for a subsequent re-optimization.

The better statistical knowledge available in the re-optimization run due to the previous partial execution helps to avoid some estimation errors from the previous run, specifically the error on the intermediate result that triggered re-optimization. After compilation and execution of the query in the re-optimization run, cleanup actions are necessary to remove the intermediate results and to free locks on tables and indexes used during the previous run.

An exemplary embodiment of the present invention modifies the POP technique so that it may be used in federated queries, which are queries in a federated data system, such as the system depicted in FIG. 3. Another exemplary embodiment of the present invention modifies POP to allow for multiple re-optimizations during federated query processing. A further exemplary embodiment of the present invention provides a way to improve query re-optimization using different costing strategies for materialization. Yet another exemplary embodiment of the present invention provides a modification to POP that allows for the dropping of redundant intermediate results.

Re-Optimizing Federated Queries

In order to apply POP to federated data systems, re-optimization constraints, called checkpoints, are placed in federated queries. POP is used to check federated queries at the point in the QEP where a remote sub statement is represented. A sub statement is a very suitable spot in which to place the re-optimization constraints, as the quality of the cardinality estimates and the cost regime change gravely at the site of a sub statement. Also, the site of a sub statement marks the lowest possible point of intervention by the federated DBMS. Cardinality is a measure to count the number of rows. A cardinality estimate is an estimation of a number of rows. For example, the cardinality estimate of a CHECK point is the estimation of the number of rows at the CHECK point. The cardinality of an intermediate result is the number of rows in an intermediate result.

Checkpoints are the POP points of control. A checkpoint is inserted into a QEP to ensure that optimization parameter estimates agree with the actual values for those parameters as measured during query execution. As an example, checkpoints are used for the monitoring of cardinality estimates. However, a checkpoint can monitor other properties as well.

Figure 5:
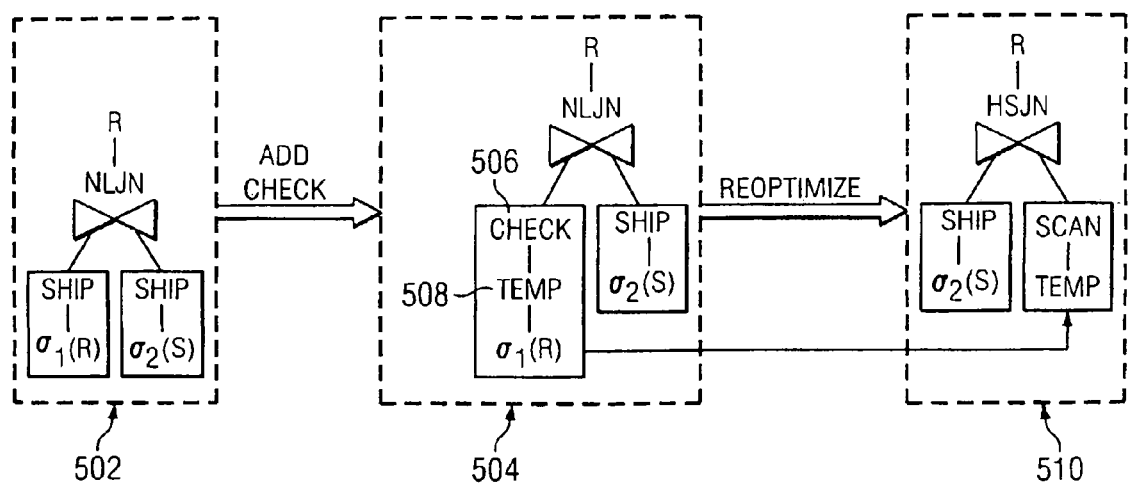
FIG. 5 is a diagram that schematically illustrates the process of adding a checkpoint to a federated query plan, in accordance with an exemplary embodiment of the present invention.

FIG. 5 is a diagram that schematically illustrates the process of adding a checkpoint to a federated query. Federated query execution plan 502 shows a simple initial plan that uses a nested-loop-join. During optimization, POP computes the validity ranges around the edges of the plan and places CHECK operators at places that are suitable or performance critical. The goal of optimization is to find the cheapest query execution plan based on the cost model. Federated query execution plan 504 shows federated query execution plan 502 after the CHECK operator, Check 506, has been added to the left side of the plan. The results of $\sigma_1(R)$ have been artificially materialized as an intermediate result, Temp 508. Materializing means storing the results that are returned by a materialization point into temporary or permanent objects. A materialization point is a point during query execution at which results up to this point have to be processed entirely before query execution can continue. Check 506 takes the validity range of its child edge as parameter. During runtime, the CHECK operator identifies whether the actual cardinality is within validity ranges and triggers re-optimization if the actual cardinality is not within validity ranges. The optimizer uses knowledge about the actual cardinality to develop the new plan, federated query execution plan 510. The intermediate result, Temp 508, is matched into federated query execution plan 510 as a temporary table, as shown on the right side of federated query execution plan 510.

Checkpoints can be placed above any naturally occurring materialized point or above artificially introduced materialized points. For federated queries the point that represents the remote sub statement is called SHIP and is a critical point for query optimization. At these points, the results for the remote sub statement are retrieved from the remote data source. For that reason, materialization points are placed on top of SHIPs implementing any one of the following three, or any combination of the following three, strategies.

The first strategy is called "All." In an "All" strategy, all SHIPs are materialized where the tuple stream is not correlated. Correlated SHIPs occur frequently, such as when a nested-loop join (NLJN) sends multiple queries for the inner plan, or with the join predicate pushed into the inner query, or when a sub query accesses remote data. This strategy maximizes the opportunity for POP, but may also impose very great overhead, when large results from a remote query are materialized.

The second strategy is called "Plan Oriented." The "Plan Oriented" strategy excludes robust spots from materialization. A robust spot is a point at which the current operator will perform well, no matter what size the result is. For example, such a spot could be the outer sub-plan of a hash join (HSJN). At this point the hash table has already been built, and the outer sub-plan can be read through. Another spot would be a pre-sorted merge join (MGJN) inner sub-plan. At this point, the outer sub-plan of the MGJN is already sorted and the join starts directly with the merging process, which only needs to read the results through once. Excluding those points makes sense because no savings can be made in regard to those points.

The third strategy is called "Size oriented." In a "Size oriented" strategy, SHIPs are materialized only up to a certain expected size. This reduces the overhead greatly while missing little opportunity for savings. If a SHIP returns a large result, it will most likely be placed at a robust point, where checking does not offer great opportunity. If the result is in fact small, then the overhead of materialization is not very big.

The query optimizer uses a number of estimates to compute the query execution costs. For relational queries these estimates can include table, index, column cardinalities, operator costs, CPU time, IO time, and many more. For remote sub statements there are potentially more estimates that represent the characteristics of the remote data source or the communication channel between the remote data source and the local system. These estimates are made on top of the estimates already made for the remote relational query. They include, but are not limited to, remote/local IO ratio, remote/local CPU time, and communication costs. Checkpoints define re-optimization constraints by applying the technique of check range computation to any of these estimates.

In the case of cardinality ranges, a checkpoint monitors the number of rows flowing from a producer to a consumer during query execution. A checkpoint suspends query execution and triggers re-optimization if the number of rows the checkpoint sees violates the check condition. Using cardinalities, a check condition defines the cardinality range, checkrange, for which the check condition is true. Determining check ranges depends on the ability to compute the validityrange for each sub-plan P rooted with plan operator o, which defines for each input stream into o the range of cardinalities for which o is the optimal root operator for P.

Multiple Re-Optimizations

Currently, POP has been suggested only for a single round of re-optimization. This means that if a QEP is determined to be sub-optimal at any checkpoint in the plan during query execution, a single re-optimization, calculated from that checkpoint, is triggered to improve the QEP. In an exemplary embodiment of the present invention, checkpoints are placed again, in the re-optimized QEP. Thus, the optimality of the QEP may be repeatedly verified during query execution.

In principle, the re-optimization phase can add check operators as well, so that the execution is again checked for sub optimality, resulting in multiple re-optimizations for a single query. This is especially useful in the situation in which the QEP contains multiple estimation errors at different points, because POP can compensate in each re-optimization for one of them.

As an example, assume a federated query that joins results from several remote data sources and that all sub-queries are processed in a sequential manner. In the regular implementation of POP, only one remote query will execute first and has the ability to trigger re-optimization. The subsequent remote queries can not trigger re-optimization, and the federated plan may still be sub-optimal. By placing checkpoints in the QEP after the first round of re-optimization, all other remote queries are able to trigger re-optimizations as well. The intermediate results for every round of re-optimization are mapped back into the plan again.

Figure 6:
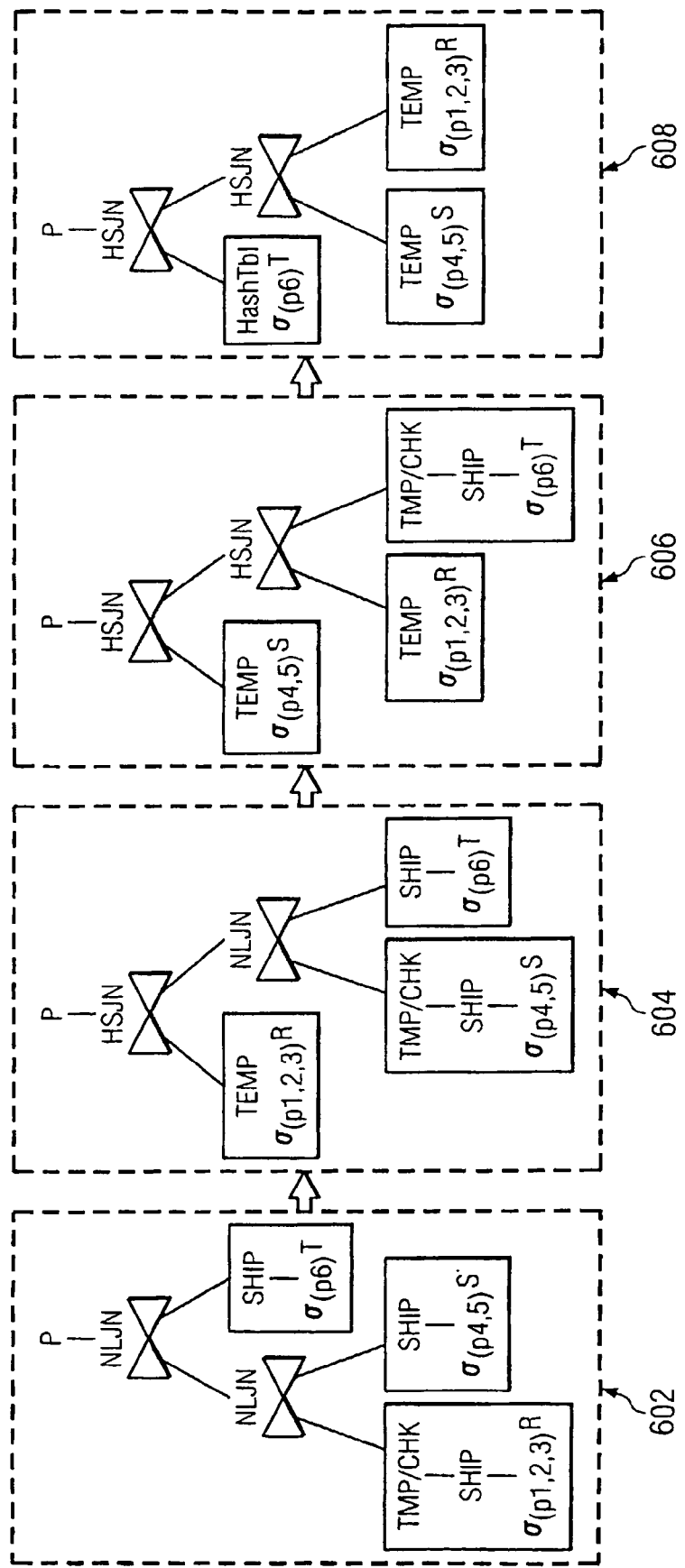
FIG. 6 is a diagram that schematically illustrates multiple re-optimizations of a query with little initial knowledge about the data, in accordance with an exemplary embodiment of the present invention.

FIG. 6 is a diagram illustrating multiple re-optimizations of a query with little initial knowledge about the data, in accordance with an exemplary embodiment of the present invention. Each re-optimization adds actual knowledge about a single table only. In the present example assume that $|\sigma_{(p6)}T|>|\sigma_{(p4,5)}S|>|\sigma_{(p1,2,3)}R|$. The initial QEP chooses wrong physical join operators, but a correct join order. Assuming that $|\sigma_{(p1,2,3)}R|$ is larger than the default estimates for the accesses to S and T, a re-optimization would place the partial result from the access to table R in the last join. Even though the re-optimized plan uses a more efficient join operator for the second join, the order becomes highly sub-optimal, resulting in many cases in a worse overall query performance. Compensation for this is possible by introducing several rounds of re-optimization. Here, each round adds knowledge about additional parts of the plan until finally the whole plan is covered with actual knowledge and a good final access plan is developed. The following is the sequence of reoptimizations that happens in FIG. 6.

$$|\sigma_{(p1,2,3)}R|<|\sigma_{(p4,5)}S|<|\sigma_{(p6)}T|=>((R\times S)\times T) \quad 1)$$

$$|\sigma_{(p4,5)}S|<|\sigma_{(p6)}T|<|\text{Temp}\sigma_{(p1,2,3)}R|=>((S\times T)\times R) \quad 2)$$

$$|\sigma_{(p6)}T|<|\text{Temp}\sigma_{(p1,2,3)}R|<|\text{Temp}\sigma_{(p4,5)}S|=>((T\times R)\times S) \quad 3)$$

$$|\text{Temp}\sigma_{(p1,2,3)}R|<|\text{Temp}\sigma_{(p4,5)}S|<|\text{Temp}\sigma_{(p6)}T|=>((R\times S)\times T) \quad 4)$$

The join order in 4) is identical to the join order in 1) The number of re-optimizations is commonly as high as the number of uncorrelated SHIP operators in the federated query plan, possibly higher if correlations on join predicates that span several SHIP operations occur.

Dropping Redundant Intermediate Results

Information about query results that has to be communicated between the current query execution and next query compilation is called intermediate results. The intermediate results may be conveniently kept in the form of temporary tables, when it is only required to pass the table objects, which hold all descriptive information, to the next phase.

The re-execution of the compiled QEP allows for already processed results to be reused. However, a new set of intermediate results is obtained during every round of re-optimization. This is potentially a problem in a case where there are multiple rounds of re-optimization and there are space constraints for storing the intermediate results. Thus, an exemplary embodiment of the present invention provides a method for determining when an intermediate result becomes redundant and may be dropped.

Figure 7:
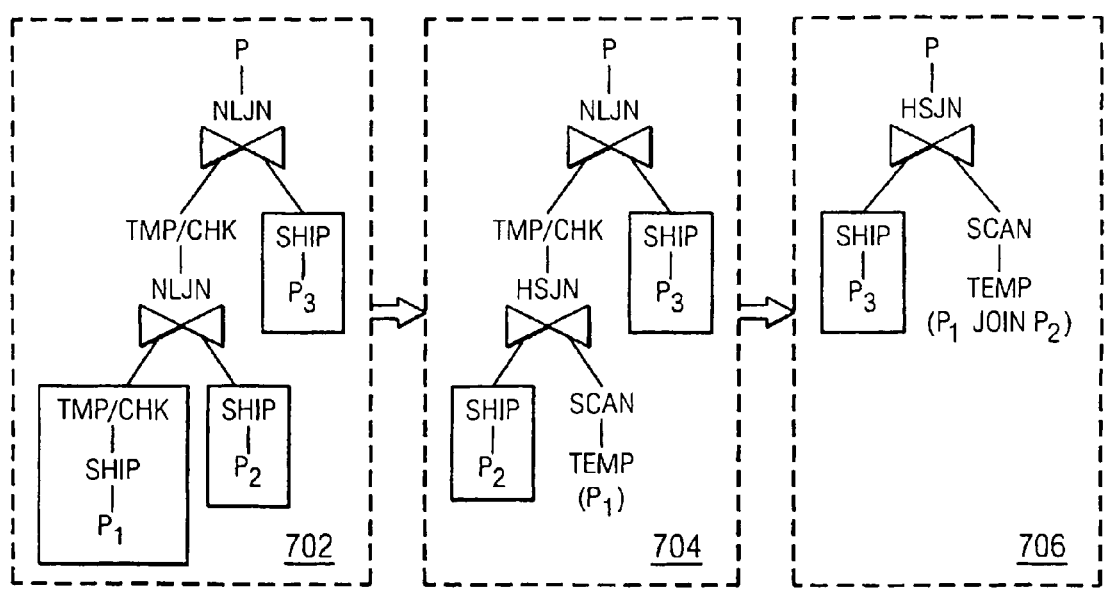
FIG. 7 is a diagram that schematically illustrates a re-optimization where the general join order remains constant and only the physical join operator is changed, in accordance with an exemplary embodiment of the present invention.

POP is not forced to reuse intermediate results but rather performs the decision to reuse them on a cost basis. Through this mechanism, POP may ignore partial results initially, but may reconsider them after another round of re-optimization or decide to fall back to another partial result. Therefore, it is dangerous and regressive to throw away partial results as soon as POP does not consider them during a re-optimization. A more commonly occurring situation is that the query continues from a partial result and creates another partial result. An example of this is when, during a re-optimization, the general join order remains constant and only the physical join operator is changed, as shown in FIG. 7 below, or when a join is pushed down to the remote data source. In those cases, the prior partial results are redundant and can be dropped in order to free temporary storage space from the DBMS.

An exemplary embodiment of the present invention introduces a heuristic. A heuristic is a process to determine a solution based on a set of rules. An exemplary rule is that an intermediate result can be dropped, if it is not included in the current plan and if another intermediate result is used that subsumes the non-used result. An intermediate result t2 subsumes another intermediate result t1, if t2 has been derived from t1 by processing at least one operator on top of the sub plan that roots at t1.

The rule after which to decide whether to declare a partial result redundant can be formulated the following way: Let o1 and o2 be operators producing the partial results t1 and t2 respectively. Furthermore, let R be a sub plan rooting at o2 and taking o1 as an input. The partial result t2 is then considered to subsume t1. In means of relational properties this implies that the properties of o1 are a subset of the properties of o2. Furthermore, t2 has to be matched in the re-optimized QEP. In this case, t1 may be declared redundant and may be dropped without risk.

FIG. 7 is a diagram illustrating a re-optimization where the general join order remains constant and only the physical join operator is changed, in accordance with an exemplary embodiment of the present invention. As shown in FIG. 7, during multiple rounds of re-optimization, the physical join operator is iteratively changed while the order stays the same. For a NLJN, the building side is the outer (depicted as the left leg in the picture), whereas for a HSJN the building side is the inner (depicted as the right leg in the picture). If the physical join operator changes from a NLJN to a HSJN, we also find the inner and outer of the join operator flipped. That, however, does not imply a change in the join order. As shown, the partial result Temp (P1) is redundant after the first re-optimization, as Temp ($P_1$) is subsumed by $P_2$.

Control Flow

FIG. 8 is a flowchart illustrating the operation of progressively refining a federated query in a federated data system, in accordance with an exemplary embodiment of the present invention. Refining a federated query is refining, or changing, the federated query in order to improve upon the performance of the query. Progressively refining a federated query involves validating the statistics and assumptions used for compiling the federated query as the federated query execution plan is executed and, when necessary, re-optimizing the federated query execution plan in mid-execution, based on the knowledge learned during the partial execution of the federated query execution plan of the federated query.

The operation may be performed by a compiler and runtime engine, such as SQL compiler 402 and runtime engine 412 in FIG. 4. The operation begins by executing a federated query according to a federated query execution plan (step 802). Next, the operation refines the federated query execution plan during execution of the federated query (step 804) and ends.

FIG. 9 is a flowchart illustrating the operation of refining the federated query execution plan during execution of the federated query, in accordance with an exemplary embodiment of the present invention. The operation may be performed by a compiler and runtime engine, such as SQL compiler 402 and runtime engine 412 in FIG. 4. The flowchart shows an exemplary embodiment for the implementation of step 804 in FIG. 8. The operation begins by placing at least one re-optimization constraint in the federated query execution plan at a location where remote data is received and further processed by the federated data system during compilation of the federated query (step 902). The remote data comes from a remote data source, such as the data sources depicted in FIG. 3, databases 304, 306, 308, 310, 312, and 314, and non-database sources such as XML tagged files such as XML 318, spreadsheets, such as Excel 320, and text documents, such as text 316, in a federated data system, such as federated data system 300 in FIG. 3. Next, responsive to the at least one re-optimization constraint being violated during execution of the federated query, the operation optimizes the federated query execution plan by refining a model of the federated query execution plan using a partially executed federated query execution plan (step 904). Then the operation recompiles the federated query (step 906). Then the operation re-executes the federated query execution plan (step 908) and then the operation ends.

Figure 10:
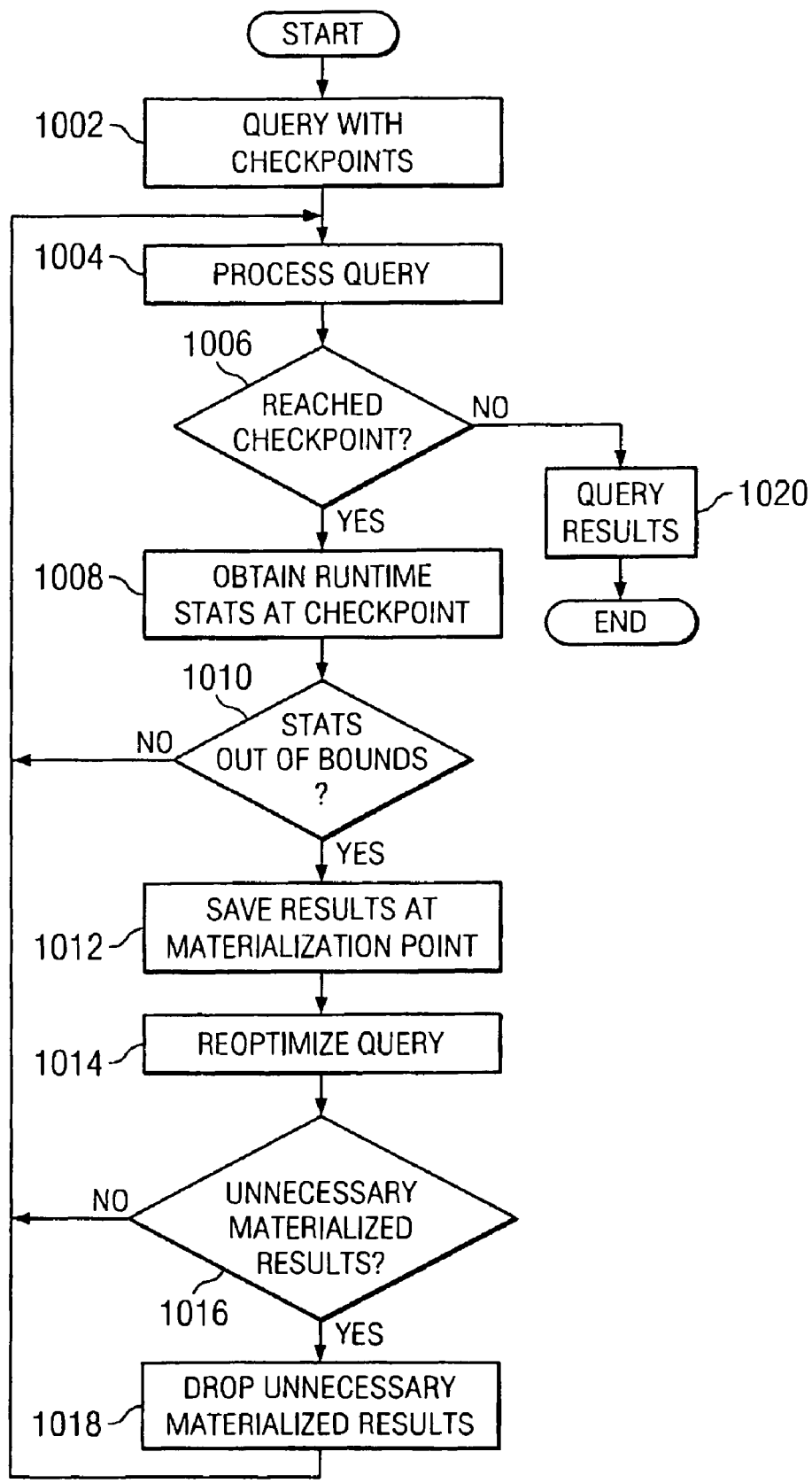
FIG. 10 is a flowchart illustrating the operation of Progressive Optimization with multiple rounds of re-optimization, in accordance with an exemplary embodiment of the present invention.

FIG. 10 is a flowchart illustrating the operation of Progressive Optimization with multiple rounds of re-optimization, in accordance with an exemplary embodiment of the present invention. The operation may be performed by a compiler and runtime engine, such as SQL compiler 402 and runtime engine 412 in FIG. 4. The flowchart shows an exemplary embodiment for the implementation of step 804 in FIG. 8 and further expands upon step 904 in FIG. 9. The operation begins with a query that has checkpoints (step 1002). The query may be compiled through the use of any method that adds checkpoints to a query. A checkpoint is a point during query execution at which the processed amount of data is compared to the estimates made for query compilation. Then the operation processes the query with checkpoints (step 1004). Next, the operation determines if a checkpoint has been reached (step 1006). If a checkpoint has not been reached (a no output to step 1006), the operation continues processing the query until the query results are available (step 1020) and the operation ends. Query results are the results of a query once the query has been executed. If a checkpoint has been reached (a yes output to step 1006), the operation obtains the runtime statistics at the checkpoint (step 1008). Runtime statistics at a checkpoint represent the amount of data processed at the checkpoint, or any other measure used in the cost model of a query optimizer. A measure is a metric used by the cost model to determine the query execution cost. Measures include, but are not limited to include, table cardinalities, index cardinalities, column cardinalities, operator costs, CPU time, and IO time, for example.

Next, the operation determines if the runtime statistics are out of bounds (step 1010). Runtime statistics that are out of bounds indicate a sub optimal QEP that needs to be adjusted. If the runtime statistics are not out of bounds (a no output to step 1010), the operation returns to step 1004 and continues to process the query. If the runtime statistics are out of bounds (a yes output to step 1010), the operation saves the results at the materialization point associated with the checkpoint (step 1012). A materialization point is a point during query execution at which results up to this point have to be processed entirely before query execution can continue.

Next, the operation re-optimizes the query (step 1014). Re-optimizing a query is the process of compiling the query using the newly obtained statistics at the checkpoint. Then the operation determines if there are any unnecessary materialized results (step 1016). Unnecessary materialized results are materialized results that are no longer needed for query processing. They are either superset by another set of materialized results or are otherwise useless in the context of the recompiled query. If there are not any unnecessary materialized results (a no output to step 1016), then the operation proceeds to step 1004 and continues to process the query. If there are unnecessary materialized results (a yes output to step 1016), the operation drops the unnecessary materialized results (step 1018). By dropping unnecessary materialized results, resources needed to store the materialized results are released. Then, the operation proceeds to step 1004 and continues processing the query.

Costing Strategies

In an exemplary embodiment of the present invention, the extra costs of query preparation with POP are visible to the query compiler. In another exemplary embodiment of the present invention, the query preparation for POP is not visible to the query compiler.

The placing of checkpoints, especially when materialization is required, may influence the query optimizer because of the costs associated with the materialization. In order to eliminate this effect and to cancel out all the costs imposed by the artificial materialization, the query preparation for POP is not made visible to the query compiler. This enables the query optimizer to compile the same plan as if no materialization points were introduced. Thus, the QEP choices are consistent throughout the rounds of re-optimization. However, the extra costs of query preparation with POP are real and might be considerable depending upon the number and size of materialization points in the plan. To exploit possible plan changes due to the costs of materialization, there may also be a mode where query preparation costs are considered during federated query optimizations. Costs of materialization are input/output costs.

Alternate Technologies

Refining a federated QEP means to compile the federated query using a different set of input values for the query compiler. These input values (e.g. cardinalities) cause the compiler to produce a different QEP. Given that the new set of input values is of better quality, the resulting QEP will be a refined version of the original QEP. There are several advantages of progressively refining federated QEPs during query execution over the existing query compile time strategies. Compile time strategies highly depend upon accurate statistics for all federated objects involved in the query. To obtain federated statistics, there has to be some form of a statistics discovery method. All such discovery methods face, and have to solve, the problems of data availability, data accuracy, and data completeness.

Data availability is limited to the statistical data provided by the remote data source. Therefore, if the remote source is a non-relational source or any other source that does not store statistical data, the federated query plan will be sub-optimal because it was compiled without knowledge about the remote objects. Data accuracy is immediately violated when data was inserted, updated, or deleted at the remote data source and the federated DBMS did not capture that change. Data completeness is especially a problem with two or more remote data sources involved in a federated query. Data correlation between two objects that live in different data sources, for example, can not be discovered by any tool that connects to a single data source only.

There is currently no known technology to satisfy the data availability, accuracy, and completeness criteria for federated object statistics. Without these statistics, federated query plans are always at risk of being sub-optimal. The mid-query re-optimization technique provided by the current invention compensates for a lack of data availability, accuracy, or completeness of federated statistics. The mid-query re-optimization technique may be applied to all queries including any type and number of data sources, whether the data sources provide statistical data or not.

Other Embodiments

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), and digital video disc (DVD).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for progressively refining a federated query execution plan in a federated data system, the computer implemented method comprising:

executing a federated query according to a federated query execution plan for the federated data system, wherein the federated data system has a federated server, a plurality of data sources including a federated database and a plurality of remote databases, and further wherein the federated data system sends distributed requests to local databases and remote databases for processing, and wherein the remote databases do not store statistical data so that the federated query execution plan is initially compiled without knowledge about the remote databases; and refining the federated query execution plan during execution of the federated query, wherein refining the federated query execution plan during execution of the federated query comprises:

placing at least one re-optimization constraint, in the federated query execution plan, at a remote database where remote data, including a statistical data, is received and further processed by the federated data system during compilation of the federated query;

responsive to the at least one re-optimization constraint being violated during execution of the federated query execution plan, optimizing the federated query execution plan by refining a model of the federated query execution plan based on the statistical data received from the remote databases during a partial execution of the federated query plan in order to compensate for a lack of data availability, accuracy, or completeness of federated statistics in regard to the remote databases;

recompiling the federated query; and re-executing the federated query execution plan; and wherein a plurality of checkpoints are placed in the query execution plan after a first round of re-optimization so that so that all other queries to any remote database are configured to also trigger re-optimizations and all intermediate results for all rounds of re-optimization are mapped back into the query execution plan; and wherein a CHECK operator identifies whether an actual cardinality is within a validity range and triggers at least one re-optimization when the actual cardinality is not within the validity range, and further comprising:

repeating the placing, optimizing, recompiling, and re-executing steps until a query result is achieved;

wherein in a plurality of multiple re-optimizations of a query with a limited initial knowledge about a plurality of data, each re-optimization adds an actual knowledge about a single table only, and where $|\sigma_{(p6)}T|>|\sigma_{(p4,5)}S|>|\sigma_{(p1,2,3)}R|$ and an initial query execution plan chooses a plurality of wrong physical join operators, but chooses a correct join order, and further assuming that $|\sigma_{(p1,2,3)}R|$ is larger than a default estimate for a plurality of accesses to S and T, a re-optimization places a partial result from an access to a table R in a last join so that a re-optimized plan using a more efficient join operator for a second join results in a worse overall query performance; and wherein compensation for the worse overall query performance is made by introducing several rounds of re-optimization, each round adding an additional knowledge about additional parts of the plan until a whole plan is covered with an actual knowledge and a final access plan is developed in accordance with the following sequence:

$$|\sigma_{(p1,2,3)}R| < |\sigma_{(p4,5)}S| < |\sigma_{(p6)}T| => ((R \times S) \times T) \quad 1)$$

$$|\sigma_{(p4,5)}S| < |\sigma_{(p6)}T| < |Temp\sigma_{(p1,2,3)}R| => ((S \times T) \times R) \quad 2)$$

$$|\sigma_{(p6)}T| < |Temp\sigma_{(p1,2,3)}R| < |Temp\sigma_{(p4,5)}S| => ((T \times R) \times S) \quad 3)$$

$$|Temp\sigma_{(p1,2,3)}R| < |Temp\sigma_{(p4,5)}S| < |Temp\sigma_{(p6)}T| => ((R \times S) \times T) \quad 4),$$

so that the join order in 4) is identical to the join order in 1).

2. The computer implemented method of claim 1, wherein re-executing the federated query execution plan re-uses intermediate results from the partially executed federated query execution plan; and wherein during the at least one re-optimization, a general join order remains constant and only a physical join operator is changed and a plurality of prior partial results are identified as redundant and dropped.

3. The computer implemented method of claim 2, further comprising:

using heuristics to determine whether to retain the intermediate results;

wherein the heuristic does not use an intermediate result when another intermediate result is used that subsumes the non-used result; and wherein an intermediate result t2 subsumes another intermediate result t1, when t2 has been derived from t1 by processing at least one operator on top of the sub plan that roots at t1.

4. The computer implemented method of claim 2, wherein re-using intermediate results from the partially executed federated query execution plan comprises:

determining whether an intermediate result of the intermediate results is included in the federated query execution plan;

responsive to a determination that the intermediate result is not included in the federated query execution plan, determining whether another intermediate result of the intermediate results is used that subsumes the intermediate result; and responsive to a determination that another intermediate result is used that subsumes the intermediate result, dropping the intermediate result.

5. The computer implemented method of claim 1, wherein the re-optimization constraints comprise a measure used in a cost model of a federated query optimizer.

6. The computer implemented method of claim 5, wherein the measure comprises constraints in estimated cardinality, or query execution cost, or CPU time, or IO time, or communication time.

7. The computer implemented method of claim 1, wherein the re-optimization constraints are materialized;

wherein a plurality of unnecessary materialized results are dropped before processing the query.

8. The computer implemented method of claim 7, wherein costs of materialization are not considered when optimizing the federated query execution plan;

wherein all costs imposed by the materialization are made not visible to a query compiler so that a query optimizer compiles a plan with no materialization points introduced and a plurality of query execution plan choices are consistent throughout a plurality of rounds of re-optimization.

9. The computer implemented method of claim 7, wherein costs of materialization are considered when optimizing the federated query execution plan.

10. The computer implemented method of claim 1, wherein the re-optimization constraints are materialized only up to a certain expected size.

11. The computer implemented method of claim 1, wherein the re-optimization constraints are not materialized for robust spots.

12. A computer program product comprising a computer usable storage medium including computer usable program code for progressively refining a federated query execution plan in a federated data system stored thereon, the computer program product comprising:

computer usable program code for executing a federated query according to a federated query execution plan for the federated data system, wherein the federated data system has a federated server, a plurality of data sources including a federated database and a plurality of remote databases, and further wherein the federated data system sends distributed requests to local databases and remote databases for processing, and wherein the remote databases do not store statistical data so that the federated query execution plan is initially compiled without knowledge about the remote databases; and computer usable program code for refining the federated query execution plan during execution of the federated query, wherein the computer usable program code for refining the federated query execution plan during execution of the federated query comprises:

computer usable program code for placing at least one re-optimization constraint, in the remote portion of the federated query execution plan, at a location where remote data, including a statistical data, is received and further processed by the federated data system during compilation of the federated query;

computer usable program code for, responsive to the at least one re-optimization constraint being violated during execution of the federated query execution plan, optimizing the federated query execution plan by refining a model of the federated query execution plan based on the statistical data received from the remote databases during a partial execution of the federated query plan in order to compensate for a lack of data availability, accuracy, or completeness of federated statistics in regard to the remote databases;

computer usable program code for recompiling the federated query;

computer usable program code for re-executing the federated query execution plan; and wherein a plurality of checkpoints are placed in the query execution plan after a first round of re-optimization so that so that all other queries to any remote database are configured to also trigger re-optimizations and all intermediate results for all rounds of re-optimization are mapped back into the query execution plan; and wherein a CHECK operator identifies whether an actual cardinality is within a validity range and triggers at least one re-optimization when the actual cardinality is not within the validity range, and wherein costs of materialization are considered when optimizing the federated query execution plan;

wherein in a plurality of multiple re-optimizations of a query with a limited initial knowledge about a plurality of data, each re-optimization adds an actual knowledge about a single table only, and where $|\sigma_{(p6)}T|>|\sigma_{(p4,5)}S|>|\sigma_{(p1,2,3)}R|$ and an initial query execution plan chooses a plurality of wrong physical join operators, but chooses a correct join order, and further assuming that $|\sigma_{(p1,2,3)}R|$ is larger than a default estimate for a plurality of accesses to S and T, a re-optimization places a partial result from an access to a table R in a last join so that a re-optimized plan using a more efficient join operator for a second join results in a worse overall query performance;

wherein compensation for the worse overall query performance is made by introducing several rounds of re-optimization, each round adding an additional knowledge about additional parts of the plan until a whole plan is covered with an actual knowledge and a final access plan is developed in accordance with the following sequence:

$|\sigma_{(p1,2,3)}R|<|\sigma_{(p4,5)}S|<|\sigma_{(p6)}T|=>((R \times S) \times T)$  1)

$|\sigma_{(p4,5)}S|<|\sigma_{(p6)}T|<|\text{Temp}\sigma_{(p1,2,3)}R|=>((S \times T) \times R)$  2)

$|\sigma_{(p6)}T|<|\text{Temp}\sigma_{(p1,2,3)}R|<|\text{Temp}\sigma_{(p4,5)}S|=>((T \times R) \times S)$  3)

$|\text{Temp}\sigma_{(p1,2,3)}R|<|\text{Temp}\sigma_{(p4,5)}S|<|\text{Temp}\sigma_{(p6)}T|=>((R \times S) \times T)$  4), so that the join order in 4) is identical to the join order in 1).

13. The computer program product of claim 12, wherein the computer usable program code for re-executing the federated query execution plan re-uses intermediate results from the partially executed federated query execution plan; and
wherein during the at least one re-optimization, a general join order remains constant and only a physical join operator is changed and a plurality of prior partial results are identified as redundant and dropped.

14. The computer program product of claim 13, further comprising:
computer usable program code for using heuristics to determine whether to retain the intermediate results;
wherein a heuristic does not use an intermediate result when another intermediate result is used that subsumes the non-used result; and
wherein an intermediate result t2 subsumes another intermediate result t1, when t2 has been derived from t1 by processing at least one operator on top of the sub plan that roots at t1.

15. The computer program product of claim 12, wherein the re-optimization constraints comprise a measure used in a cost model of a federated query optimizer.

16. The computer program product of claim 15, wherein the measure comprises constraints in at least one of estimated cardinality, query execution cost, CPU time, IO time, or communication time.

17. The computer program product of claim 12, wherein the re-optimization constraints are materialized;
wherein a plurality of unnecessary materialized results are dropped before processing the query.

18. The computer program product of claim 17, wherein costs of materialization are not considered when optimizing the federated query execution plan;
wherein all costs imposed by the materialization are made not visible to a query compiler so that a query optimizer compiles a plan with no materialization points introduced and a plurality of query execution plan choices are consistent throughout a plurality of rounds of re-optimization.

19. The computer program product of claim 12, further comprising:
computer usable program code for repeating the placing, optimizing, recompiling, and re-executing steps until a query result is achieved.

20. The computer program product of claim 12, wherein the re-optimization constraints are materialized only up to a certain expected size.

21. The computer program product of claim 12, wherein the re-optimization constraints are not materialized for robust spots.

22. An apparatus comprising:
a bus;
a storage device connected to the bus, wherein the storage device contains computer usable code;
at least one managed device connected to the bus;
a communications unit connected to the bus; and
a processing unit connected to the bus, wherein the processing unit executes the computer usable code to execute a federated query according to a federated query execution plan for the federated data system, wherein the federated data system has a federated server, a plurality of data sources including a federated database and a plurality of remote databases, and further wherein the federated data system sends distributed requests to local databases and remote databases for processing, and wherein the remote databases do not store statistical data so that the federated query execution plan is initially compiled without knowledge about the remote databases; and refine the federated query execution plan during execution of the federated query, wherein refining the federated query execution plan during execution of the federated query comprises: placing at least one re-optimization constraint in the federated query execution plan at a remote database where remote data, including a statistical data, is received and further processed by the federated data system during compilation of the federated query, and responsive to the at least one re-optimization constraint being violated during execution of the federated query execution plan, optimizing the federated query execution plan by refining a model of the federated query execution plan based on the statistical data received from the remote databases during a partial execution of the federated query plan in order to compensate for a lack of data availability, accuracy, or completeness of federated statistics in regard to the remote databases; recompile the federated query; and re-execute the federated query execution plan; and
wherein a plurality of checkpoints are placed in the query execution plan after a first round of re-optimization so that all other queries to any remote database are configured to also trigger re-optimizations and all intermediate results for all rounds of re-optimization are mapped back into the query execution plan; and
wherein a CHECK operator identifies whether an actual cardinality is within a validity range and triggers the at least one re-optimization when the actual cardinality is not within the validity range, and further comprising:
repeating the placing, optimizing, recompiling, and re-executing steps until a query result is achieved;
wherein in a plurality of multiple re-optimizations of a query with a limited initial knowledge about a plurality of data, each re-optimization adds an actual knowledge about a single table only, and where $|\sigma_{(p6)}T|>|\sigma_{(p4,5)}$ $S| > |\sigma_{(p1,2,3)}R|$ and an initial query execution plan chooses a plurality of wrong physical join operators, but chooses a correct join order, and further assuming that $|\sigma_{(p1,2,3)}R|$ is larger than a default estimate for a plurality of accesses to S and T, a re-optimization places a partial result from an access to a table R in a last join so that a re-optimized plan using a more efficient join operator for a second join results in a worse overall query performance; and wherein compensation for the worse overall query performance is made by introducing several rounds of re-optimization, each round adding an additional knowledge about additional parts of the plan until a whole plan is covered with an actual knowledge and a final access plan is developed in accordance with the following sequence:

$$|\sigma_{(p1,2,3)}R| < |\sigma_{(p4,5)}S| < |\sigma_{(p6)}T| => ((R \times S) \times T) \quad 5)$$

$$|\sigma_{(p4,5)}S| < |\sigma_{(p6)}T| < |Temp\sigma_{(p1,2,3)}R| => ((S \times T) \times R) \quad 6)$$

$$|\sigma_{(p6)}T| < |Temp\sigma_{(p1,2,3)}R| < |Temp\sigma_{(p4,5)}S| => ((T \times R) \times S) \quad 7)$$

$$|Temp\sigma_{(p1,2,3)}R| < |Temp\sigma_{(p4,5)}S| < |Temp\sigma_{(p6)}T| => ((R \times S) \times T) \quad 8),$$

so that the join order in 4) is identical to the join order in 1).

* * * * *